(12) United States Patent
Higashibara et al.

(10) Patent No.: US 8,346,071 B2
(45) Date of Patent: Jan. 1, 2013

(54) CAMERA SYSTEM AND METHOD OF CORRECTING CAMERA FITTING ERRORS

(75) Inventors: Kiyoshi Higashibara, Kanagawa (JP);
Daisuke Sugawara, Kanagawa (JP);
Kazuhiko Sakai, Kanagawa (JP);
Akihiro Kanaoka, Kanagawa (JP)

(73) Assignees: Sony Corporation, Tokyo (JP); Nissan Motor Co., Ltd., Kanagawa (JP)

( * ) Notice: Subject to any disclaimer, the term of this patent is extended or adjusted under 35 U.S.C. 154(b) by 776 days.

(21) Appl. No.: 12/166,558

(22) Filed: Jul. 2, 2008

(65) Prior Publication Data
US 2009/0010630 A1    Jan. 8, 2009

(30) Foreign Application Priority Data
Jul. 4, 2007    (JP) .................. 2007-175917

(51) Int. Cl.
*G03B 17/00* (2006.01)
*G06K 9/36* (2006.01)
(52) U.S. Cl. .......... 396/50; 396/429; 348/148; 382/289; 382/293
(58) Field of Classification Search ............ 396/50
See application file for complete search history.

(56) References Cited

U.S. PATENT DOCUMENTS

| | | | | |
|---|---|---|---|---|
| 4,969,036 A * | 11/1990 | Bhanu et al. | ............. | 348/113 |
| 5,036,474 A * | 7/1991 | Bhanu et al. | ............. | 348/117 |
| 6,104,438 A * | 8/2000 | Saito | ............. | 348/587 |
| 6,618,494 B1 * | 9/2003 | Nonay et al. | ............. | 382/132 |
| 6,785,404 B1 * | 8/2004 | Shimazaki et al. | ........... | 382/104 |
| 2001/0006554 A1 * | 7/2001 | Kakinami | ............. | 382/104 |
| 2006/0171563 A1 * | 8/2006 | Takashima et al. | ........... | 382/104 |
| 2006/0291698 A1 * | 12/2006 | Oizumi | ............. | 382/104 |
| 2008/0036857 A1 * | 2/2008 | Shimazaki | ............. | 348/113 |

FOREIGN PATENT DOCUMENTS

| | | |
|---|---|---|
| CN | 153250 A | 9/2004 |
| JP | 2005 217889 | 8/2005 |
| WO | WO 2005/074287 | * 8/2005 |

OTHER PUBLICATIONS

JP 2005-217889 Shimazaki (Machine English Translation), Nov. 8, 2005, 16 pages.*

* cited by examiner

*Primary Examiner* — Clayton E LaBalle
*Assistant Examiner* — Bret Adams
(74) *Attorney, Agent, or Firm* — Frommer Lawrence & Haug LLP; William S. Frommer; Ellen Marcie Emas

(57) ABSTRACT

A camera system includes a detection unit that detects fitting errors of a camera as displacement quantities in a first direction, a second direction and an optical axis rotating direction of an image picked up by the camera, a selection unit that selects a rotation correcting quantity corresponding to the displacement quantity in the optical axis rotating direction from plural rotation correction maps prepared in advance, a computation unit that computes the correcting quantities in the first direction and the second direction respectively based on the detected displacement quantities in the first direction and the second direction using linear equations; and a correction unit that corrects the displacements in the first direction, the second direction and the optical axis rotating direction of the picked up image based on the selected rotation correcting quantity and the computed correcting quantities in the first direction and the second direction.

4 Claims, 7 Drawing Sheets

$d1 < d0 < d2$

CAMERA SYSTEM AND METHOD OF CORRECTING CAMERA FITTING ERRORS

CROSS REFERENCES TO RELATED APPLICATIONS

The present invention contains subject matter related to Japanese Patent Application JP2007-175917 filed in the Japanese Patent Office on Jul. 4, 2007, the entire contents of which being incorporated herein by reference.

BACKGROUND OF THE INVENTION

1. Field of the Invention

The present invention relates to a camera system and a method of correcting camera fitting errors.

2. Description of the Related Art

With a camera system such as a vehicle camera system for monitoring the outside of a vehicle by means of the camera fitted to the vehicle, unignorable fitting errors arise when the camera is fitted to the vehicle. When such fitting errors arise, discrepancies appear between the area actually shot by the camera and the area that the camera is supposed to shoot.

On the other hand, reference lines and an expected course line are displayed on the monitor screen for monitoring the outside of the vehicle with the image picked up by the camera. If discrepancies appear between the area actually shot by the camera and the area that the camera is supposed to shoot due to the camera fitting errors, the reference lines and the expected course line are displaced from their proper positions in the image picked up by the camera.

Therefore, there have been proposed outside-the-vehicle monitoring systems that are designed not to display the image picked up by the camera straight but to operate for image transforms in order to improve the recognition on the part of the driver. According to a popular image transform technique, a map showing the corresponding relationship between the input to the image transform system (the image picked up by the camera) and the output of the system (the image output to the monitor screen after the image transform) is prepared and an image transform process is executed by means of the map, while the map is recomputed according to the fitting errors of the camera so as to correct the fitting error of the camera by correcting the scope of display of the monitor screen (see, for example, Jpn. Pat. Appln. Laid-Open Publication No. 2005-217889).

SUMMARY OF THE INVENTION

With the above-described conventional art, not only the fitting error in the first direction (X-direction) and the fitting error in the second direction (Y-direction) orthogonal relative to the first direction but also the rotary error in the rotating direction around the optical axis of the camera can be corrected. However, since the fitting errors are found only after fitting the camera in position, the parameters necessary for correcting the errors in the X-direction, in the Y-direction and the optical axis rotating direction are finely defined by re-computing the map only after the camera fitting position is determined and the fitting errors are detected. In other words, the process of correcting the fitting errors is time consuming.

Techniques of estimating a plurality of sets of camera fitting errors in advance, defining a plurality of sets of parameters corresponding to those sets of camera fitting errors and preparing a plurality of maps by computations in advance are also known. However, with such a technique, the number of maps that are prepared in advance is enormous and there arises a problem that the system memory for storing the map is required to have a large memory capacity.

Assume here, as an example, maps are prepared in 10 steps for the correction of each of the X-direction, the Y-direction and the optical axis rotating direction. Then, 1,000 (=10×10×10) maps are required. 10 steps may be considered to be conservative because a high degree of precision has been required for image transforms in recent years. Then, the number of maps increases as the number of steps increases. Then, the necessary capacity of the system memory becomes enormous.

Thus, the present invention provides a camera system and a method of correcting camera fitting errors that can minimize the number of maps to be prepared for correcting images in advance without requiring re-computations for maps for image transforms in the process of correcting fitting errors.

In order to correct camera fitting errors, an aspect of the present invention includes features of: detecting fitting errors of a camera as a displacement quantity in a first direction, the displacement quantity in a second direction and the displacement quantity in an optical axis rotating direction of an image picked up by the camera; selecting a rotation correcting quantity corresponding to the detected displacement quantity in the optical axis rotating direction from a plurality of rotation correction maps prepared in advance; computing the correcting quantity in the first direction and the correcting quantity in the second direction respectively on the basis of the detected displacement quantity in the first direction and the detected displacement quantity in the second direction by means of linear expressions; and correcting the displacement in the first direction, the displacement in the second direction and the displacement in the optical axis rotating direction on the basis of the selected rotation correcting quantity, the computed correcting quantity in the first direction and the computed correcting quantity in the second direction.

Thus, according to another aspect of the present invention, while a map is used for correcting the optical axis rotating direction, no re-computations are required for the map. In other words, only a map needs to be selected from a plurality of rotation correction maps that are prepared in advance. Furthermore, only simple linear expressions are used for the corrections in the first and second directions. Therefore, the camera fitting errors can be corrected without requiring re-computations of maps and maps prepared in advance by defining parameters corresponding to a plurality of sets of expected fitting errors by computations.

In short, a map is used for correcting the optical axis rotating direction and simple linear expressions are used for correcting the first and second directions according to the present invention. Thus, it is no longer necessary to re-compute maps for image transforms and maps needs to be prepared in advance for image corrections only for the optical axis rotating direction so that the required number of maps is remarkably reduced.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, preferred embodiments of the present invention will be described in greater detail by referring to the accompanying drawings.

Figure 1:
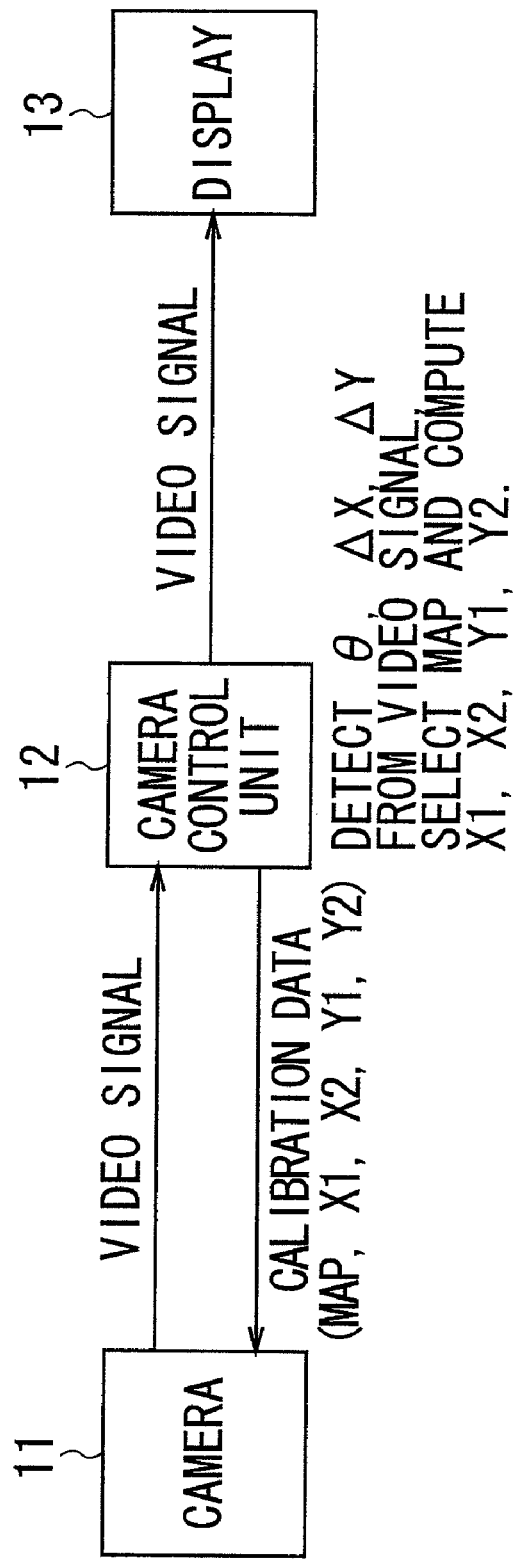
FIG. 1 is a schematic block diagram of a camera system according to an embodiment of the present invention, illustrating the system configuration thereof.

FIG. 1 is a schematic block diagram of a camera system according to an embodiment of the present invention, illustrating the system configuration thereof. As shown in FIG. 1, the camera system 1 of the present embodiment includes a camera 11, a camera control unit 12 and a display 13 and is typically operated as vehicle camera system, of which the camera 11 is fitted to a vehicle (not shown) to monitor the outside of the vehicle.

The camera 11 has a wide angle lens such as a fisheye lens so that it can shoot a wide range outside the vehicle. It is fitted to a predetermined position of the vehicle. For example, it may be fitted to a front position of the vehicle or a rear position of the vehicle. Alternatively, it may be housed in a door mirror and arranged at a right or left position of the vehicle. While a single camera 11 is arranged in FIG. 1, plural cameras 11 are arranged as a matter of fact. For example, four cameras may be arranged respectively at the four corners of the vehicle.

The camera 11 has a known image transform function for correcting image distortions attributable to the lens of the camera 11 and also a calibration function for correcting the fitting errors in an image picked up by the camera that arise when the camera 11 is fitted to the vehicle according to the calibration data given from the camera control unit 12. The calibration function will be described in greater detail later.

The calibration data that are given from the camera control unit 12 to the camera 11 may typically include rotation correction maps, the lens center X-direction shift quantity X1, the lens center Y-direction shift quantity Y1, the image cutout position X-direction shift quantity X2 and the image cutout position Y-direction shift quantity Y2.

The camera control unit 12 has a CPU and detects the fitting position displacement quantities of the camera 11 relative to the vehicle according to the video signal of the image picked up by the camera 11 and output from the camera 11 under the control of the CPU. More specifically, the fitting position displacement quantities of the camera 11 include the X-direction displacement quantity $\Delta X$, the Y-direction displacement quantity $\Delta Y$, the optical axis rotating direction displacement quantity $\theta$. The fitting position displacement quantities $\Delta X$, $\Delta Y$ and $\theta$ and detection thereof will be described in greater detail later.

The camera control unit 12 has a memory in addition to the CPU, selects a map showing a value closest to the detected optical axis rotating direction displacement quantity $\theta$ from the plurality of rotation correction maps stored in the memory and sends the map to the camera 11. The memory of the camera control unit 12 estimates a plurality of sets of optical axis rotating direction displacement quantities $\theta$ and prepares (stores) a plurality of rotation correction maps that correspond to the estimated plurality of sets of displacement quantities.

Furthermore, the camera control unit 12 computes the lens center X-direction shift quantity X1, the lens center Y-direction shift quantity Y1, the image cutout position X-direction shift quantity X2 and the image cutout position Y-direction shift quantity Y2, using the X-direction displacement quantity $\Delta X$ and the Y-direction displacement quantity $\Delta Y$ that are detected and arithmetic formulas, which will be described later, under the control of the CPU and sends the results of the computations to the camera 11.

The display 13 is typically a liquid crystal display, a plasma display or an organic electro luminescence (EL) display and displays an image formed on the basis of the video signal that is obtained from the image picked up and cut out by the camera 11 and supplied by way of the camera control unit 12.

The image that is displayed on the display 13 is an image that is obtained as a result of the process of correcting the camera fitting errors that arise when the camera 11 is fitted to the vehicle executed by the camera 11 on the basis of the calibration data given from the camera control unit 12 including the rotation correction map, the lens center X-direction shift quantity X1, the lens center Y-direction shift quantity Y1, the image cutout position X-direction shift quantity X2 and the image cutout position Y-direction shift quantity Y2.

Assume here that the vehicle camera system picks up a grid-like image (more specifically, an image of the grid lines defining vehicle parking spaces) from the ground by means of the camera 11 and displays it on the display 13.

Firstly, the instance where the camera 11 is properly fitted to the vehicle and hence there are no fitting errors, will be described below by referring to FIGS. 2A and 2B.

Figure 2A:
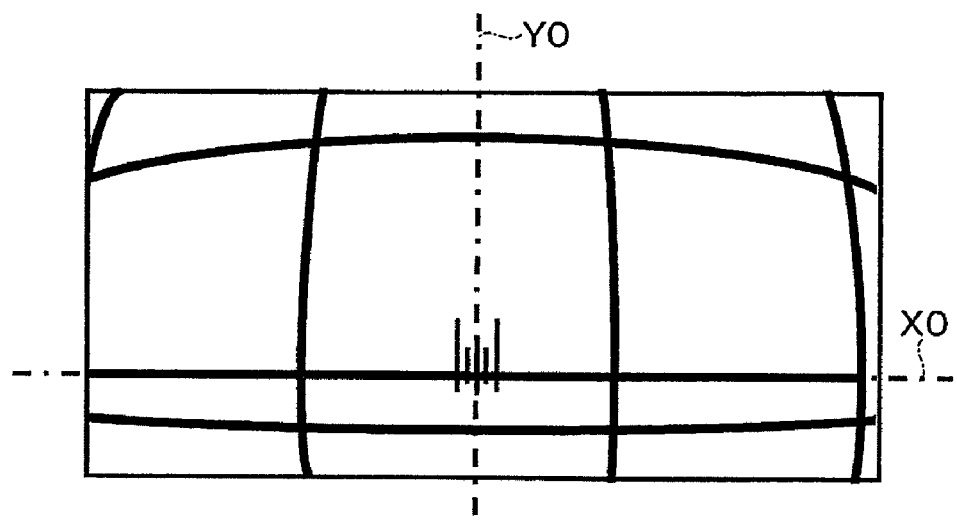
FIGS. 2A and 2B are schematic illustrations of an instance where there are no camera fitting errors.

Since the camera 11 is provided with a fisheye lens, as the image picked up and cut out by the camera 11 is enlarged around the optical axis, it becomes a distorted image that is centered at reference line X0 running in the first direction (X-direction) of the picked up image that passes through the optical axis and reference line Y0 running in the second direction (Y-direction) that is orthogonal to the first direction and also passes through the optical axis as shown in FIG. 2A.

Figure 2B:
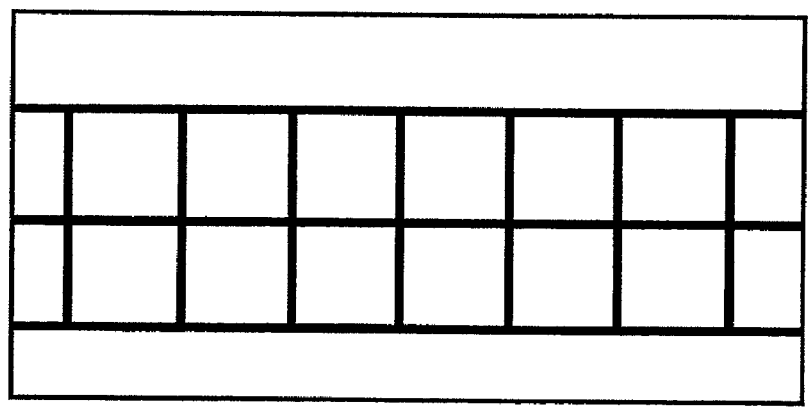

However, as the camera 11 executes an image transform process for correcting the distortions of the image attributable to the lens, a grid-like image obtained by correcting the distortions attributable to the lens as shown in FIG. 2B is displayed on the display 13.

Figure 3A:
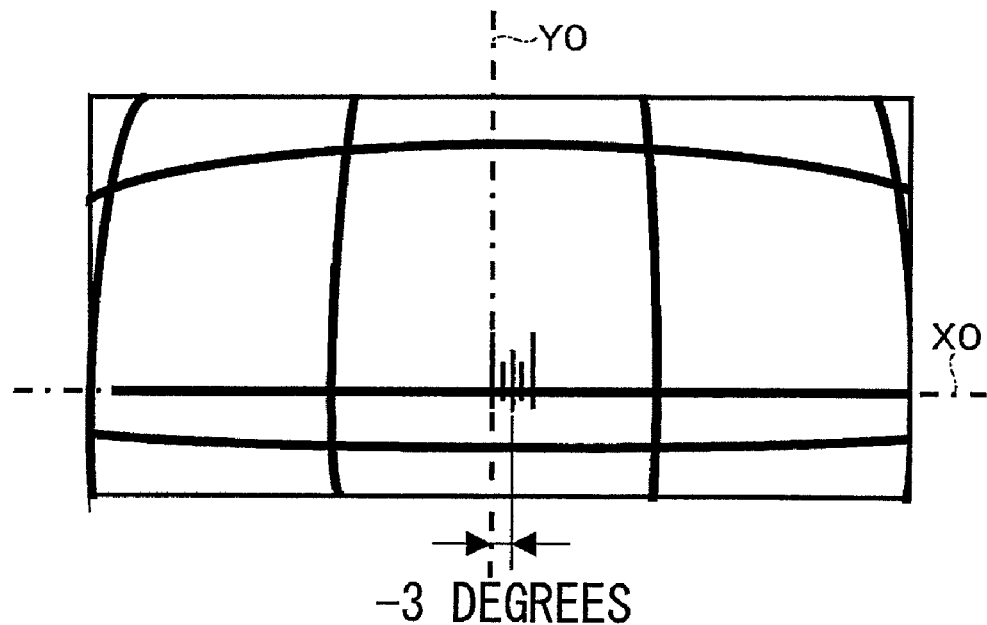
FIGS. 3A and 3B are schematic illustrations of an instance where there are camera fitting errors.

Now, the instance where the camera 11 is fitted to the vehicle at a position displaced in the X-direction relative to the proper fitting position will be described below by referring to FIGS. 3A and 3B. The image shown in FIG. 3A is a distorted image enlarged around the optical axis that is obtained when the camera 11 is fitted to the vehicle with a displacement of −3 degrees, for instance, relative to the reference line X0 in the X-direction.

When such a fitting error is involved, while the camera 11 executes an image transform process on the distorted image for correcting the distortions of the image attributable to the lens and the distortions of the image that are attributable to the lens are corrected, there arises a distortion that is attributable to the fitting error in the X-direction.

Figure 3B:
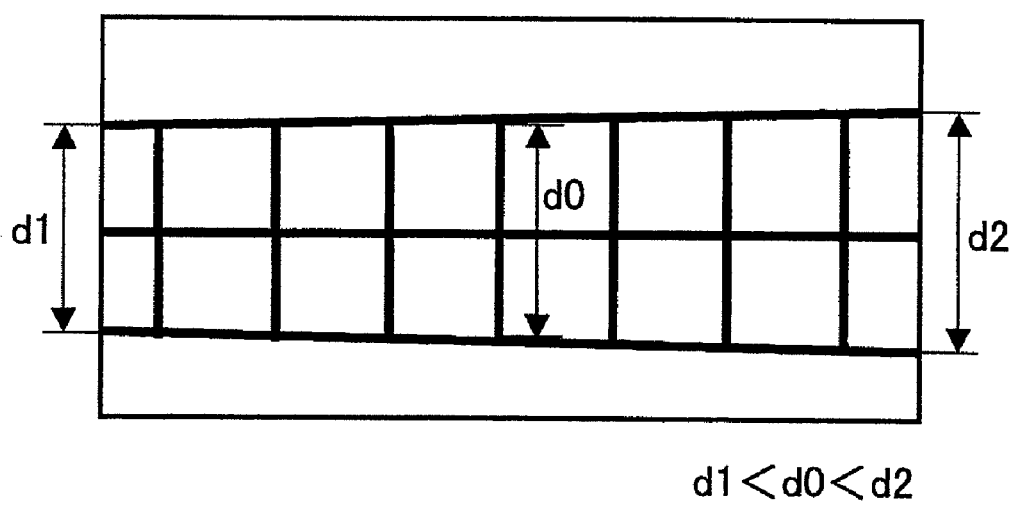

More specifically, the image displayed on the display 13 is a distorted grid-like image as shown in FIG. 3B where the distance d1 at the left side is smaller than the corresponding distance d0 at the optical axis, where the corresponding distance d2 at the right side is greater than the distance d0 at the optical axis.

(Calibration Process)

Figure 4:
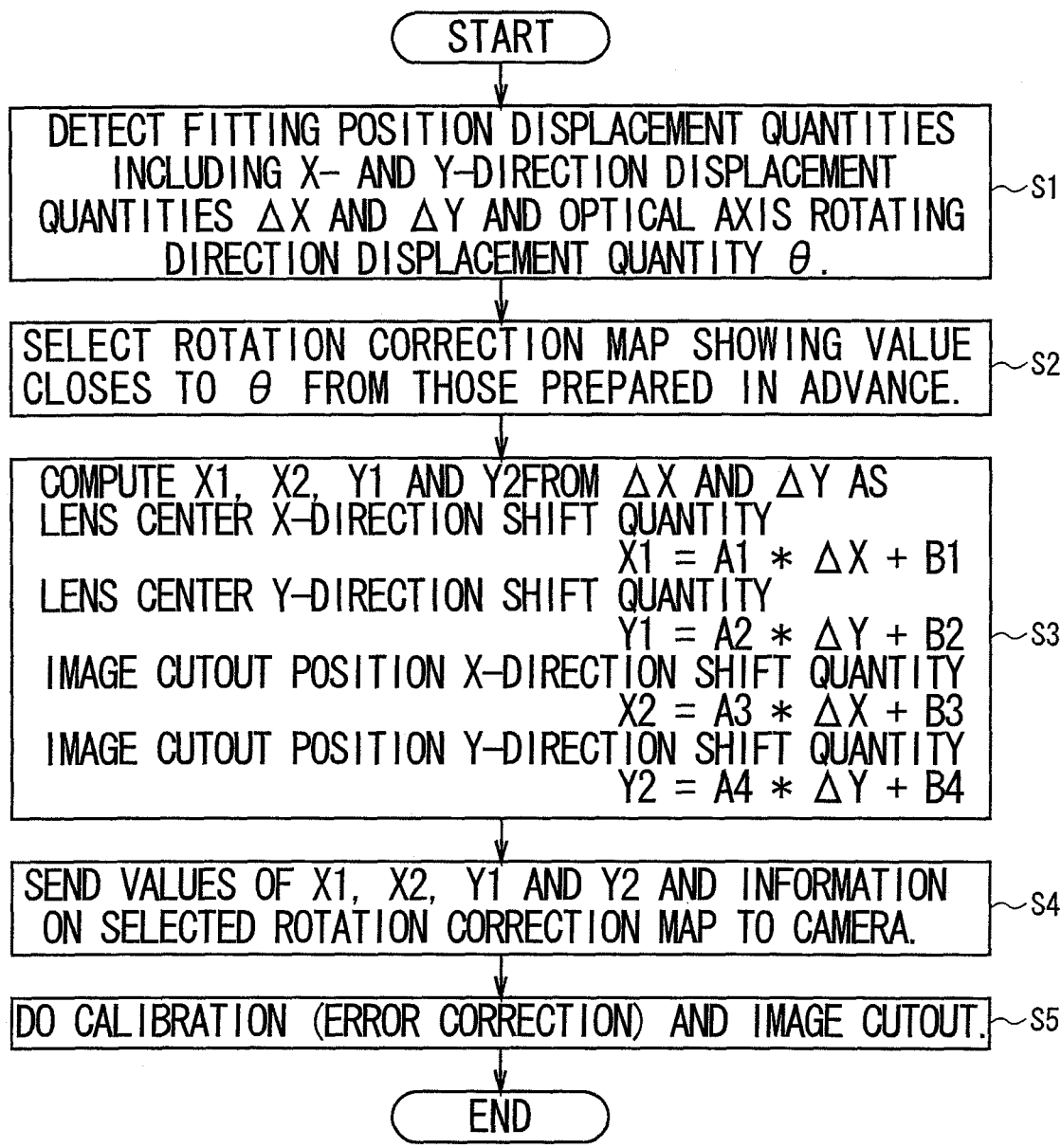
FIG. 4 is a flowchart illustrating the sequence of operation of the calibration process according to the embodiment of the present invention.

The vehicle camera system 10 of this embodiment corrects the fitting errors by executing a calibration process (fitting error correcting process) having a process sequence as shown in the flowchart of FIG. 4 when the camera 11 is fitted to a position displaced from the proper fitting position.

Referring to the flowchart of FIG. 4, firstly the fitting displacement quantities including the X-direction displacement quantity $\Delta X$, the Y-direction displacement quantity $\Delta Y$ and the optical axis rotating direction displacement quantity $\theta$ are detected (Step S1) and then the rotation correction map that shows an optical axis rotating direction displacement quantity closest to the detected optical axis rotating direction displacement quantity $\theta$ is selected from the plurality of rotation correction maps prepared in advance on the basis of the detected optical axis rotating direction displacement quantity $\theta$ (Step S2). The processing operations of Steps S1 and S2 are executed by the camera control unit 12.

Then, the lens center X-direction shift quantity X1, the lens center Y-direction shift quantity Y1, the image cutout position X-direction shift quantity X2 and the image cutout position Y-direction shift quantity Y2 are computationally determined by using the X-direction displacement quantity $\Delta X$ and the Y-direction displacement quantity $\Delta Y$ (Step S3) and subsequently the computationally determined values of X1, X2, Y1 and Y2 and information on the selected rotation correction map are sent to the camera 11 (Step S4). The processing operations of Steps S3 and S4 are also executed by the camera control unit 12.

Then, the camera 11 executes a process of cutting out an image of a predetermined output range, while executing the calibration process of correcting the fitting errors of the camera 11 relative to the vehicle on the basis of the calibration data given from the camera control unit 12 and including the values of X1, X2, Y1 and Y2 and the information on the selected rotation correction map (Step S5). Note that the processing operation of Step S2 may come before or after the processing operation of Step S3.

As a result of the calibration process, if the fitting position of the camera 11 relative to the vehicle is displaced and the image picked up by the camera 11 is displaced by −3 degrees relative to the reference line X0 in the X-direction as shown in FIG. 3A, the image displayed on the display 13 is a grid-like image as shown in FIG. 2B that is obtained by correcting the distortions attributable to the lens and the fitting errors of the camera 11. In other words, the mechanical fitting errors of the camera 11 relative to the vehicle can be corrected by means of an electric calibration process.

(Fitting Position Displacement Quantities $\Delta X$, $\Delta Y$, $\theta$)

Now, the fitting position displacement quantities $\Delta X$, $\Delta Y$ and $\theta$ will be described below.

To begin with, assume that the region to be shot by the camera 11 is marked with a reference mark of "+" that is to be aligned with the center of the display screen of the display 13 when the camera is fitted to the proper fitting position in order to detect the errors of the fitting position (fitting errors) of the actual fitting position of the camera 11 relative to the proper fitting position on the vehicle.

Figure 5:
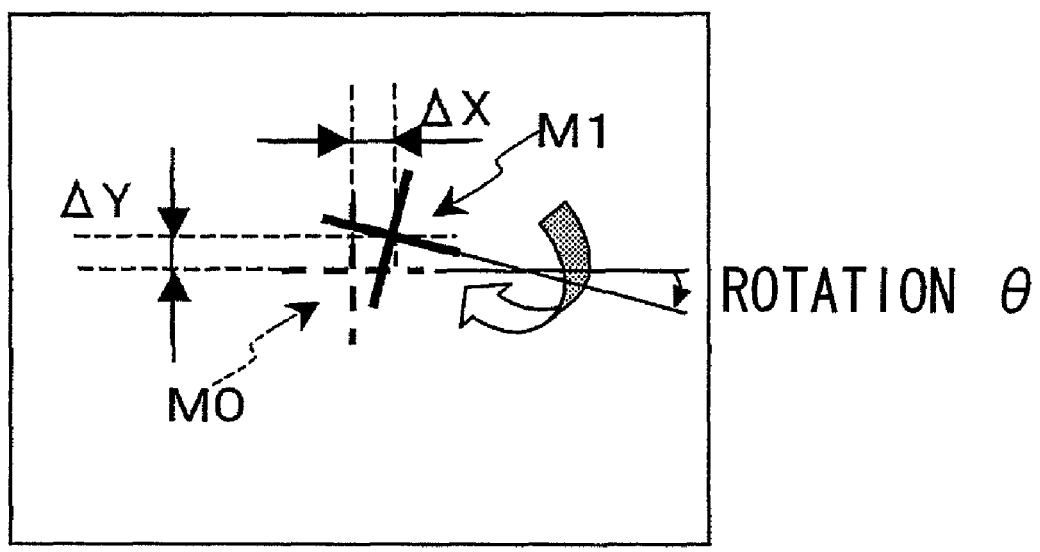
FIG. 5 is a schematic illustration of fitting position displacement quantities $\Delta X$, $\Delta Y$ and $\theta$.

If the position of the camera 11 involves fitting errors when the camera 11 is actually fitted to the vehicle and operated to pick up an image, the reference mark M1 of "+" marked in the region to be shot is displaced from the target mark M0 of the reference position indicated by broken lines in FIG. 5. Note that $\Delta X$ is the displacement quantity in the X-direction and $\Delta Y$ is the displacement quantity in the Y-direction while $\theta$ is the displacement quantity in the optical axis rotating direction.

(Detection of $\Delta X$, $\Delta Y$, $\theta$)

Now, detection of the displacement quantities of the fitting position including the X-direction displacement quantity $\Delta X$, the Y-direction displacement quantity $\Delta Y$ and the optical axis rotating direction displacement quantity $\theta$ will be described below.

Assume here as an example that cursor (to be referred to as "detection mark" hereinafter) M0 whose home position is that of the target mark M0 indicated by broken lines in FIG. 5 is displayed on the display screen of the display 13 and the observer moves/rotates the detection mark M0 by operating the keys for directing moves in horizontal and vertical directions and rotations in the optical axis rotating direction that are arranged in the operation section (not shown) to make its position agree with that of the reference mark M1 on the picked up image and detects the quantities by which the detection mark is moved and rotated as X-direction displacement quantity $\Delta X$, Y-direction displacement quantity $\Delta Y$ and optical axis rotating direction displacement quantity $\theta$.

Figure 6:
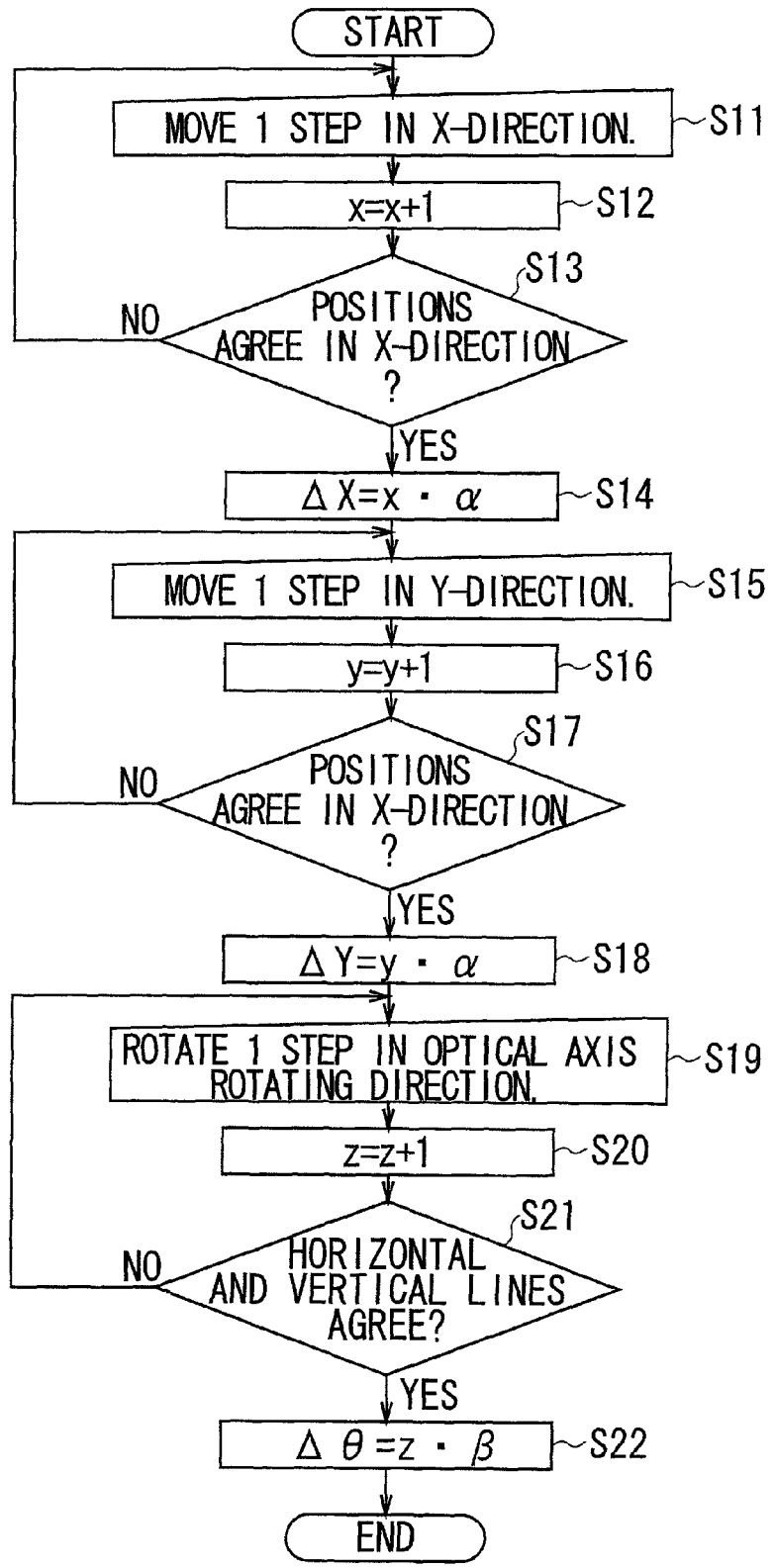
FIG. 6 is a flowchart illustrating an exemplar sequence of operation of detecting displacement quantities $\Delta X$, $\Delta Y$ and $\theta$.

Now, the sequence of operation of the detection process of detecting the X-direction displacement quantity $\Delta X$, the Y-direction displacement quantity $\Delta Y$ and the optical axis rotating direction displacement quantity $\theta$ will be described below by referring to the flowchart of FIG. 6. It is assumed here that the position of the detection mark M0 and that of the reference mark M1 on the picked up image shows a relationship as illustrated in FIG. 4.

The observer firstly moves the detection mark M0 in the X-direction by one step by operating the corresponding key, seeing the relationship of the position of the detection mark (target mark) M0 and that of the reference mark M1 on the picked up image (Step S11). At this time, as the CPU receives the key input, it increments the counter reading x of the X-direction counter by one (Step S12).

The move of one step in the X-direction corresponds to a move of distance $\alpha$ that is the unit in this detection process. The X-direction counter counts up when the detection mark M0 is moved right in FIG. 5, whereas it counts down when the detection mark M0 is moved left in FIG. 5.

Then, the observer visually determines if the center of the detection mark M0 agrees with the center of the reference mark M1 in the X-direction or not (Step S13). If they do not agree with each other, the observer repeats the processing operations of Steps S11 and S12 until he or she determines that they agree with each other.

When the center of the detection mark M0 agrees with the center of the reference mark M1 in the X-direction, the counter reading x of the X-direction counter shows the number of steps by which the detection mark M0 is moved. Then, the displacement quantity $\Delta X$ in the X-direction is determined by multiplying the counter reading x of the X-direction counter by distance $\alpha$ (Step S14).

Subsequently, the observer moves the detection mark M0 in the Y-direction by one step by operating the corresponding key, seeing the relationship of the position of the detection mark (target mark) M0 and that of the reference mark M1 on the picked up image (Step S15). At this time, as the CPU receives the key input, it increments the counter reading y of the Y-direction counter by one (Step S16).

Similar to the case in the X-direction, the move of one step in the Y-direction corresponds to a move of distance $\alpha$ that is the unit in this detection process. The Y-direction counter counts up when the detection mark M0 is moved up in FIG. 5, whereas it counts down when the detection mark M0 is moved down in FIG. 5.

Then, the observer visually determines if the center of the detection mark M0 agrees with the center of the reference mark M1 in the Y-direction or not (Step S17). If they do not agree with each other, the observer repeats the processing operations of Steps S15 and S16 until he or she determines that they agree with each other.

When the center of the detection mark M0 agrees with the center of the reference mark M1 in the Y-direction, the counter reading y of the Y-direction counter shows the number of steps by which the detection mark M0 is moved. Then, the displacement quantity ΔY in the Y-direction is determined by multiplying the counter reading y of the Y-direction counter by distance α (Step S18).

Thereafter, the observer drives the detection mark M0 to rotate in the optical axis rotating direction by one step by operating the corresponding key, seeing the relationship of the position of the detection mark (target mark) M0 and that of the reference mark M1 on the picked up image (Step S19). At this time, as the CPU receives the key input, it increments the counter reading z of the optical axis rotating direction counter by one (Step S20).

The rotation of one step in the optical axis rotating direction corresponds to a rotary motion of angle β that is the unit in this detection process. The optical axis rotating direction counter counts up when the detection mark M0 is driven to rotate clockwise in FIG. 5, whereas it counts down when the detection mark M0 is driven to rotate counterclockwise in FIG. 5.

Then, the observer visually determines if the vertical and horizontal lines of the detection mark M0 agree with those of the reference mark M1 or not (Step S21). If they do not agree with each other, the observer repeats the processing operations of Steps S19 and S20 until he or she determines that they agree with each other.

When the horizontal and vertical lines of the detection mark M0 agree with those of the reference mark M1, the counter reading z of the optical axis rotating direction counter shows the number of steps by which the detection mark M0 is driven to rotate. Then, the displacement quantity θ in the optical axis rotating direction is determined by multiplying the counter reading z of the optical axis rotating direction counter by angle β that is the unit angle (Step S22).

As a result of the sequence of the above-described processing operations, if the fitting position of the camera 11 involves errors relative to the vehicle, the fitting position displacement quantities including the X-direction displacement quantity ΔX, the Y-direction displacement Quantity ΔY and the optical axis rotating direction displacement quantity θ can be detected from the picked up image that contains the reference mark M1.

Note that the above-described sequence of processing operations of the process is only an example and the present invention is by no means limited thereto. Any technique may be used for the purpose of the present invention so long as it can detect the X-direction displacement quantity ΔX, the Y-direction displacement quantity ΔY and the optical axis rotating direction displacement quantity θ.

(Computations of X1, Y1, X2, Y2)

As the fitting position displacement quantities ΔX, ΔY and θ are detected in the above-described manner, the lens center X-direction shift quantity X1, the lens center Y-direction shift quantity Y1, the image cutout position X-direction shift quantity X2 and the image cutout position Y-direction shift quantity Y2 are computationally determined on the basis of the X-direction displacement quantity ΔX and the Y-direction displacement quantity ΔY, by using the simple linear expressions listed below.

$$X1 = A1 * \Delta X + B1$$

$$Y1 = A2 * \Delta Y + B2$$

$$X2 = A3 * \Delta X + B3$$

$$Y2 = A4 * \Delta Y + B4$$

If the position of the detection mark M0 in FIG. 5 is the optical axis displacement detection reference position and the position of the reference mark M1 in FIG. 5 is the calibration position (the position displaced by the position to be aligned with reference position/fitting errors), the coefficients A1 through A4 can be computationally determined from the number of pixels of the image pickup device of the camera 11, the number of display pixels of the display 13 and the lens distortion characteristic value of the optical axis displacement detection reference position and the calibration position.

More specifically, assume here that the number of pixels of the image pickup device of the camera 11, or the number of pixels in the X-direction and the number of pixels in the Y-direction of the output image of the camera 11 are $Xd\_c$ and $Yd\_c$ respectively and the number of display pixels of the display 13, or the number of pixels in the X-direction and the number of pixels in the Y-direction of the output image of the camera control unit 12 are $Xd\_u$ and $Yd\_u$ respectively.

Figure 7:
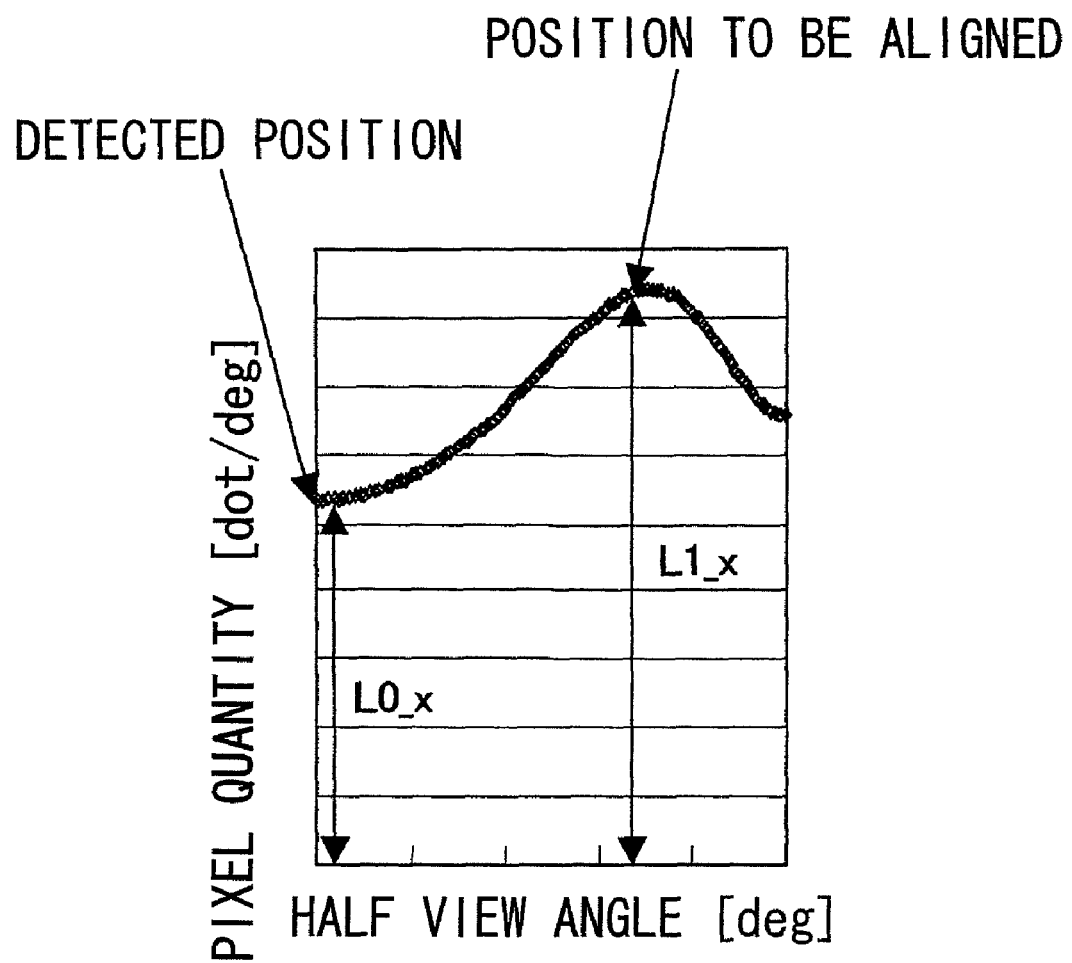
FIG. 7 is a graph illustrating the lens distortion characteristic at the optical axis detection reference position and at the calibration position.

On the other hand, the lens distortion characteristic value of the optical axis displacement detection reference position and calibration position is expressed by half view angle [deg]–pixel quantity [dot/deg] as shown in FIG. 7. The pixel quantity at the optical axis displacement detection reference position in the X-direction is expressed by $L0\_x$ and the pixel quantity at the calibration position is expressed by $L1\_x$. While FIG. 7 shows the lens distortion characteristic is for the X-direction, a similar relationship applies to the Y-direction. Thus, the pixel quantity at the optical axis displacement detection reference position in the Y-direction is expressed by $L0\_y$ and the pixel quantity at the calibration position is expressed by $L1\_y$.

Then, the coefficients A1 through A4 are computationally determined by means of the arithmetic formulas shown below.

$$A1 = (Xd\_c/Xd\_u) * (L1\_x/L0\_x)$$

$$A2 = (Yd\_c/Yd\_u) * (L1\_y/L0\_y)$$

$$A3 = (Xd\_c/Xd\_u) * (L1\_x/L0\_x)$$

$$A4 = (Yd\_c/Yd\_u) * (L1\_y/L0\_y)$$

The constants B1 through B4 are design center values (values when ΔX=0, ΔY=0) of the parameters that are determined by the fitting conditions (position, optical axis and so on) of the camera 11 and the contents of image transform.

(Effect and Advantages of the Embodiment)

As described above, with the vehicle camera system (the camera system of this embodiment) 10 whose camera is to be fitted to a vehicle in order to monitor the outside of the vehicle, when the fitting errors of the camera 11 relative to the vehicle are corrected, the X-direction displacement quantity ΔX, the Y-direction displacement quantity ΔY and the optical axis rotating direction displacement quantity θ are detected as the fitting position displacement quantities of the camera 11 relative to the vehicle and the rotation correction map showing a value closest to the detected optical axis rotating direction displacement quantity θ is selected from the plurality of rotation correction maps prepared in advance is given for the quantity by which the optical axis rotating direction is corrected.

On the other hand, for the quantities by which the X-direction and the Y-direction are corrected, the lens center X-direction shift quantity X1, the lens center Y-direction shift quantity Y1, the image cutout position X-direction shift quantity X2 and the image cutout position Y-direction shift quantity Y2 are computed by means of simple linear expressions on the basis of the X-direction displacement quantity ΔX and the Y-direction displacement quantity ΔY that are detected and the results of the computations are given to the camera 11. The processing operation of computing the lens center X-direction shift quantity X1, the lens center Y-direction shift quantity Y1, the image cutout position X-direction shift quantity X2 and the image cutout position Y-direction shift quantity Y2 may come before or after the processing operation of selecting the rotation correction map because they are independent from each other.

Thus, as a result of computationally determining the correcting quantities in the X- and Y-directions by means of simple linear expressions and selecting a rotation correction map from a plurality of rotation correction maps prepared in advance for the quantity by which the optical axis rotating direction is corrected, it is no longer necessary to recompute the map for image transform and the number of maps that need to be prepared in advance for image corrections is remarkably reduced because only maps for optical axis rotating directions need to be prepared. Additionally, the image obtained as a result of corrections is equivalent as the image obtained by mechanically adjusting the errors of fitting the camera 11 or the image obtained by re-computing a map for image transform.

While the above embodiment is described in terms of a vehicle camera system, the present invention is by no means limited thereto and the present invention can apply to a stationary monitor camera system in order to correct the errors of fitting a monitor camera.

It should be understood by those skilled in the art that various modifications, combinations, sub-combinations and alterations may occur depending on design requirements and other factors insofar as they are within the scope of the appended claims or the equivalents thereof.

What is claimed is:

1. A camera system comprising:
   detection means for detecting fitting errors of a camera by detecting only a displacement quantity in a first direction of an image picked up by the camera, a displacement quantity in a second direction of the image picked up by the camera and a displacement quantity in an optical axis rotating direction of the image picked up by the camera;
   selection means for selecting a rotation correcting quantity closest to the displacement quantity in the optical axis rotating direction detected by the detection means from a plurality of rotation correction maps prepared in advance;
   computation means for computing, using linear equations, the correcting quantity in the first direction and the correcting quantity in the second direction respectively on the basis of the displacement quantity in the first direction and the displacement quantity in the second direction detected by the detection means; and
   correction means for correcting the fitting errors of the camera using the displacement in the first direction, the displacement in the second direction and the displacement in the optical axis rotating direction of the image picked up by the camera on the basis of only (a) the rotation correcting quantity selected by the selection means and (b) the correcting quantity in the first direction and the correcting quantity in the second direction computed by the computation means.

2. The camera system according to claim 1, wherein the detection means detects the errors of the fitting position of the camera relative to a prescribed fitting position of a vehicle.

3. A method of correcting camera fitting errors comprising:
   detecting fitting errors of a camera by detecting only a displacement quantity in a first direction of an image picked up by the camera, a displacement quantity in a second direction of the image picked up by the camera and a displacement quantity in an optical axis rotating direction of the image picked up by the camera;
   selecting a rotation correcting quantity closest to the detected displacement quantity in the optical axis rotating direction from a plurality of rotation correction maps prepared in advance and computing, using linear equations, the correcting quantity in the first direction and the correcting quantity in the second direction respectively on the basis of the detected displacement quantity in the first direction and the detected displacement quantity in the second direction; and
   correcting the fitting errors of the camera using the displacement in the first direction, the displacement in the second direction and the displacement in the optical axis rotating direction on the basis of only (a) the selected rotation correcting quantity, and (b) the computed correcting quantity in the first direction and the computed correcting quantity in the second direction.

4. A camera system comprising:
   a detection unit that detects fitting errors of a camera by detecting only a displacement quantity in a first direction of an image picked up by the camera, a displacement quantity in a second direction of the image picked up by the camera and a displacement quantity in an optical axis rotating direction of the image picked up by the camera;
   a selection unit that selects a rotation correcting quantity closest to the displacement quantity in the optical axis rotating direction detected by the detection unit from a plurality of rotation correction maps prepared in advance;
   a computation unit that computes, using linear equations, the correcting quantity in the first direction and the correcting quantity in the second direction respectively on the basis of the displacement quantity in the first direction and the displacement quantity in the second direction detected by the detection unit; and
   a correction unit that corrects the fitting errors of the camera using the displacement in the first direction, the displacement in the second direction and the displacement in the optical axis rotating direction on the basis of only (a) the rotation correcting quantity selected by the selection unit and (b) the correcting quantity in the first direction and the correcting quantity in the second direction computed by the computation unit.

* * * * *